US010235224B2

(12) United States Patent
Crowther et al.

(10) Patent No.: US 10,235,224 B2
(45) Date of Patent: Mar. 19, 2019

(54) VALIDATION AND PARSING PERFORMANCE USING SUBTREE CACHING

(71) Applicant: International Business Machines Corporation, Armonk, NY (US)

(72) Inventors: Fiona M. Crowther, Lancashire (GB); Geza Geleji, Hampshire (GB); Christopher J. Poole, Hampshire (GB); Martin A. Ross, Hampshire (GB); Craig H. Stirling, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 26 days.

(21) Appl. No.: 15/409,356

(22) Filed: Jan. 18, 2017

(65) Prior Publication Data

US 2018/0203748 A1 Jul. 19, 2018

(51) Int. Cl.
*G06F 9/54* (2006.01)
*G06F 13/42* (2006.01)

(52) U.S. Cl.
CPC .......... *G06F 9/546* (2013.01); *G06F 13/4282* (2013.01)

(58) Field of Classification Search
CPC . G06F 9/546; G06F 9/54; G06F 9/544; G06F 9/465; G06F 9/542
See application file for complete search history.

(56) References Cited

U.S. PATENT DOCUMENTS

| 2004/0103105 | A1* | 5/2004 | Lindblad | G06F 17/30011 |
| 2007/0074228 | A1 | 3/2007 | Suzumura et al. | |
| 2010/0161584 | A1* | 6/2010 | Lindblad | G06F 17/30911 707/706 |
| 2012/0215858 | A1* | 8/2012 | Bhogal | H04L 67/2842 709/206 |

OTHER PUBLICATIONS

Lelli, Francesco, Maron, Gaetano, Orlando, Salvatore, Improving the performance of XML based technologies by caching and reusing information, pp. 1-9.
Takase, Toshiro, et al., An Adaptive, Fast, and Safe XML Parser Based on Byte Sequences Memorization, IBM Tokyo Research Laboratory, pp. 1-10.

* cited by examiner

*Primary Examiner* — Charles E Anya
(74) *Attorney, Agent, or Firm* — Patterson + Sheridan, LLP

(57) ABSTRACT

The present disclosure relates to techniques for processing messages at an enterprise service bus in a distributed computing system. An example method generally includes receiving, at an enterprise service bus, a first message. The enterprise service bus uses a preprocessing agent to identify a message fragment, compute a hash value of the message fragment, and using the hash value as a key, to receive an existing parse tree from a cache. A parsing agent generates a message parse tree representing the first message, where the message parse tree incorporates the existing parse tree to represent the message fragment portion of the first message. A transforming agent generates a second message from the message parse tree where the second message has different (Continued)

format from the first message, the transforming agent transmits the second message to a receiving system.

20 Claims, 6 Drawing Sheets

VALIDATION AND PARSING PERFORMANCE USING SUBTREE CACHING

BACKGROUND

This disclosure relates to techniques for processing messages at an enterprise service bus in a distributed computing system, and more specifically to reducing computing overhead attributable to deserializing messages by reusing information.

Distributed computer systems generally represent a network of disparate independent computers that can include workstations, mobile devices, and servers using a variety of operating systems to run a number of software applications. The software applications can offer specific services to other applications, such as, by way of example, retrieving information or executing data operations, but individual applications generally do not guarantee the interoperability with all other network systems. As a result, distributed computer systems can include an enterprise service bus to provide interoperability between the heterogeneous applications providing and requesting services. Generally, the enterprise service bus provides interoperability by receiving messages from services, deserializing the messages, transforming the messages to the format required by the recipient, serializing the message and transmitting it to a recipient service. An enterprise service bus may provide additional operations depending on the system architecture and requirements of the network components.

SUMMARY

One embodiment disclosed herein provides a method for providing interoperability between systems in a distributed computing environment. The method generally includes generating, at an enterprise service bus, a hash value of a message fragment from a first message. The enterprise service bus retrieves a first parse tree from a key value cache using the hash value as a key. The enterprise service bus generates a message parse tree and uses the existing parse tree to represent the message fragment. The enterprise service bus processes the first message using the message parse tree.

Another embodiment includes a computer-readable storage medium storing instructions, which, when executed on a processor, performs an operation for providing interoperability between systems in a distributed computing environment. The processor generates a hash value of a message fragment from a first message. The processor retrieves a first parse tree from a key value cache using the hash value as a key. The processor generates a message parse tree and uses the existing parse tree to represent the message fragment. The processor processes the first message using the message parse tree.

Still another embodiment includes an enterprise service bus with a processor and memory hosting an message processing program, which, when executed on the processor, performs an operation for providing interoperability between systems in a distributed computing environment. The operation generally generates, at an enterprise service bus, a hash value of a message fragment from a first message. The enterprise service retrieves a first parse tree from a key value cache using the hash value as a key. The enterprise service bus generates a message parse tree and uses the existing parse tree to represent the message fragment. The enterprise service bus processes the first message using the message parse tree.

Figure 1:
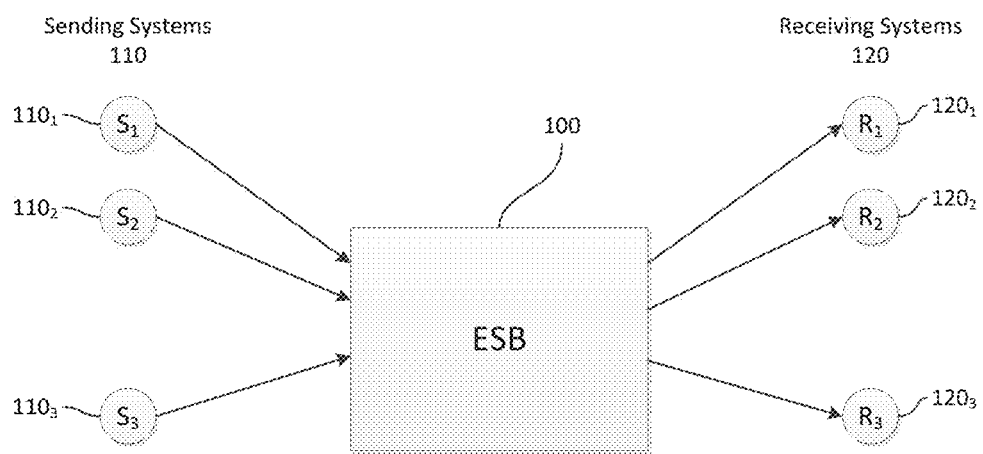
FIG. 1 illustrates an example of a service oriented computing environment which includes an enterprise service bus to facilitate communication between systems requesting and providing services, according to one embodiment.

To facilitate understanding, identical reference numerals have been used, where possible, to designate identical elements that are common to the figures. It is contemplated that elements and features of one embodiment may be beneficially incorporated into other embodiments without further recitation.

DETAILED DESCRIPTION

Embodiments described herein provide techniques for improving message parsing and validation operations performed by an enterprise service bus in a distributed computing environment.

Generally, service oriented software architecture models use an enterprise service bus ("ESB") to provide flexible communication between applications in a distributed computing environment. The ESB allows applications to communicate by translating messages from a sending system to a message type for a receiving system. Using an ESB within the distributed computing environment provides interoperability between independently deployed systems running heterogeneous applications. Thus, the ESB allows systems using distinct communications protocols to communicate in a distributed computing environment. Doing so allows new system services to be added to the distributed computing environment without the new service being interoperable with all other services. Commonly, independently developed systems do not adopt a standardized communications protocol and instead use a proprietary protocol or different public protocols.

To provide interoperability between the heterogeneous communications protocols, an ESB receives a message from a system providing services to distributed computing environment, parses message text to validate the message format and perform semantic analysis to produce a parse tree representing the message object being communicated to the receiving system, transforms the message object from the format of the sending system to the format of the receiving system, serializes the formatted message for the communications protocol used by the receiving system, and transmits the serialized message to the receiving system. One drawback of using an ESB is slower communication speed between services attributable to the time required by the ESB to process and transform messages between services.

Embodiments presented herein provide an ESB which uses similarities between messages to reduce the deserialization overhead of a new message, in some cases. For example, the ESB may reuse information gained from previously processing a similar message. In one embodiment, the ESB builds and maintains a cache of previously deserialized message fragments (and associated parse tree data) to preserve information gained from prior operations. For example, the ESB may identify message fragments for optimization by performing an analysis of a new message, such as an XML or JSON message, and when a fragment is identified for potential optimization, the ESB creates a hash value of the identified message fragment and queries the cache to determine if it contains a value for that associated with the hash value. If the cache contains a value for the hash value, then the ESB retrieves the existing parse tree from the cache and sends it with the message to the parser as an optimization element. If the cache does not contain a value for the hash value, then the ESB sends the identified message substring and its associated hash value to the parser as a hash couplet.

When the parser encounters a message fragment from an optimization element, the parser incorporates the existing parse tree into a message parse tree representing the new message. If the message fragment is associated with a hash couplet, the parser completes its semantic analysis of the message fragment to create a parse subtree representing the message fragment, and stores the newly created parse subtree and hash value from the hash couplet into the cache. In some embodiments the cache may also include metadata related to the message fragment and prior processing results that do not depend on application state. One example of such metadata is the whether the message fragment is known to have passed a message schema validation. When metadata is maintained in the cache, the parser can utilize that information to further reduce its processing overhead by, for example, reapplying the validation result to portions of a new message subject to the same message schema.

FIG. 1 illustrates an example of a service oriented computing environment including an ESB 100 to enable communication between systems providing and accessing services, according to one embodiment. As shown, ESB 100 receives messages from sending systems 110 that provide services in the computing environment and sends messages to receiving systems 120 that request services in the computing environment. In one embodiment, sending systems 110 is a heterogeneous group of devices, such as a web server $110_1$, a file server $110_2$, and a database management system $110_3$, and receiving systems 120 is a heterogeneous group of devices, such as a network server $120_1$, a mobile device $120_2$, and a workstation $120_3$. A receiving system 120 requests a service offered by a sending system 110, such as, by way of example, a workstation receiving system $120_3$ requests database management system $110_1$ to provide a report. Sending systems 110 and receiving systems 120 may not use compatible communications protocols because the sending systems 110 and receiving systems 120 may be been programmed to use proprietary protocols, different public communications protocols, or incompatible versions of the same communications protocol. Thus, direct communication between the sending systems 110 and the receiving systems 120 is not possible without ESB 100 translating messages between the two protocols. Sending system 110 and receiving system 120 may often exchange many messages with each other while the service is being provided, and many of the messages may have common substrings. Common message substrings may also be present in messages sent from a sending service 110 to different receiving services 120 or in messages sent by different receiving services 120 to the sending service 110. The ESB 100, as described below, is configured to process messages by identifying optimization elements that the ESB 100 may have already processed, allowing the ESB 100 to reuse the prior processing result.

Figure 2:
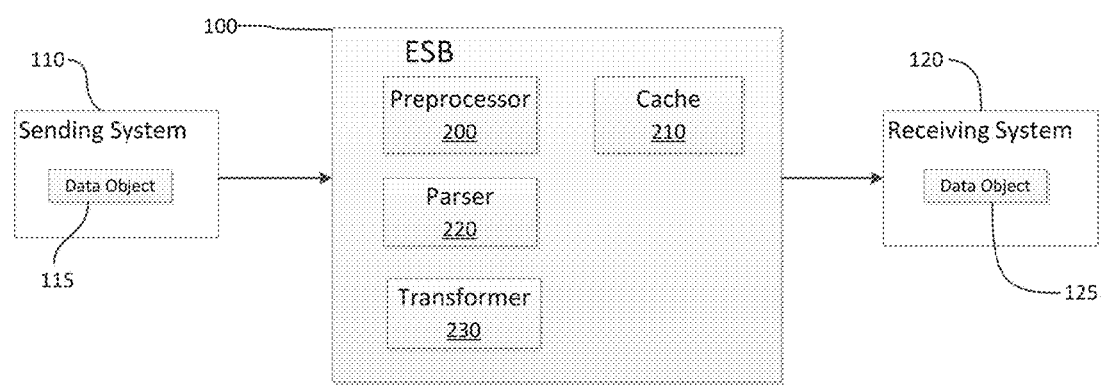
FIG. 2 is a block diagram illustrating an example enterprise service bus, according to one embodiment.

FIG. 2 further illustrates an example of the ESB 100 enabling communication between a sending system 110 and a receiving system 120. The ESB includes a preprocessor 200, a cache 210, a parser 220, and a transformer 230. As shown, sending system 110 includes a data object 115 that has been requested by receiving system 120. The sending system 110 serializes data object 115 into a first message formatted according to the sending system's 110 communication protocol. Sending system 110 transmits the first message to ESB 100, which deserializes the first message into text used by preprocessor 200 to identify substrings of the message for optimization. The preprocessor 200 uses cache 210 to create optimization elements and hash couplets as output data and passes the output data and the first message text to parser 220. Cache 210 is a key value store that uses a hash value as the cache key and a parse tree as the cache value. The hash value cache key is calculated from a message fragment from a prior message, and the cache value is the portion of the message parse tree, i.e., subtree, corresponding to the message fragment. Preprocessor 200 creates an optimization element when it identifies a text string in the first message eligible for optimization whose hash value has a corresponding key value pair in cache 210. Preprocessor 200 creates the optimization element by pairing the text string with the existing parse tree retrieved from the cache 210. If the cache 210 does not have a key value pair corresponding to the hash value of the identified text string, then preprocessor 200 creates a hash couplet that parser 220 uses to add a new key value pair to cache 210 for the identified text string.

Parser 220 processes a message to creating a parse tree, which is an ordered, rooted tree that represents the structure of the message that the transformer 230 can use to create a second message using the communications protocol of the receiving system 120. Parser 220 first performs a lexical analysis by scanning the text of the message to identify meaningful symbols, i.e., tokens, as defined by the communication protocol. The parser 220 uses the rules of the communication protocol to determine if a string should be a token. Rules defining tokens can be based on regular expressions, specific sequences of characters, i.e. a "flag", delimiting characters, special characters, and explicit definitions maintained in a dictionary of the message format. For example, XML messages may use a paired tags defined by the XML language as flags, i.e, <tag> . . . </tag>, and JSON messages can use JSON format tags, i.e., {tag:value, tag2: {tag3:value}}. That is, the parser 220 scans the message text and generates a token when it recognizes a string or character identified by the rules of the communications protocol as important. Once the message is represented by a series of tokens, the parser 220 validates the message by performing a syntactic analysis to confirm that the tokens form an allowable expression under the rules of the communications protocol. After message validation, parser 220 performs a semantic analysis that processes the tokens to build the message parse tree representing the message.

As parser 220 is performing the lexical analysis it can use the optimization elements from preprocessor 200 to eliminate the need to perform validation, semantic analysis, or both, for portions of the message matching the optimization element. Parser 220 does this by inserting the existing parse tree from an optimization element into the message parse tree. Incorporating existing parse trees increases efficiency of the parsing process because it reduces the amount of information the parser 220 processes for a message. Parser 220 can reuse the existing parse tree in the message parse tree it is constructing because the message fragment from the optimization element has been previously processed—i.e. subjected to lexical analysis to generate tokens, validation that this portion is allowable expression, and semantic analysis of tokens to generate a parse tree representing the string. Repeating these steps for a string with identical text generates an identical parse tree, so the parser 220 can use the existing parse tree without performing those steps.

Parser 220 also processes hash couplet elements that it receives from the preprocessor 200. The hash couplet elements include a text string that the preprocessor 200 identified as a candidate for optimization, but the hash value calculated from that string did not have a matching key value pair in the cache 210. The second element of the hash couplet element is the calculated hash value of the candidate text string. Parser 220 uses hash couplet elements to populate cache 210 with new key value pairs. As parser 220 is performing the lexical analysis of the first message, it compares the first message text to the candidate text strings from the hash couplet elements received from the preprocessor 210. When parser 220 identifies first message text matching a hash couplet string, parser 220 associates the tokens generated from the matching string with hash couplet. As parser 220 creates the message parse tree from the tokens from the first message, parser 220 identifies tokens corresponding to a hash couplet, creates a parse subtree corresponding to those tokens, and adds the hash value from the hash couplet and the parse subtree to the cache 210 as a new key value pair.

Once parser 220 completes a message parse tree, it sends the message parse tree to the transformer 230. Transformer 230 takes the message parse tree and creates a second message using the receiving system's 120 communication protocol. ESB 100 serializes the second message and transmits it to receiving system 120. Receiving system 120 deserializes the second message and constructs data object 125 as the logical equivalent of data object 115 in a format usable by receiving system 120.

Figure 3:
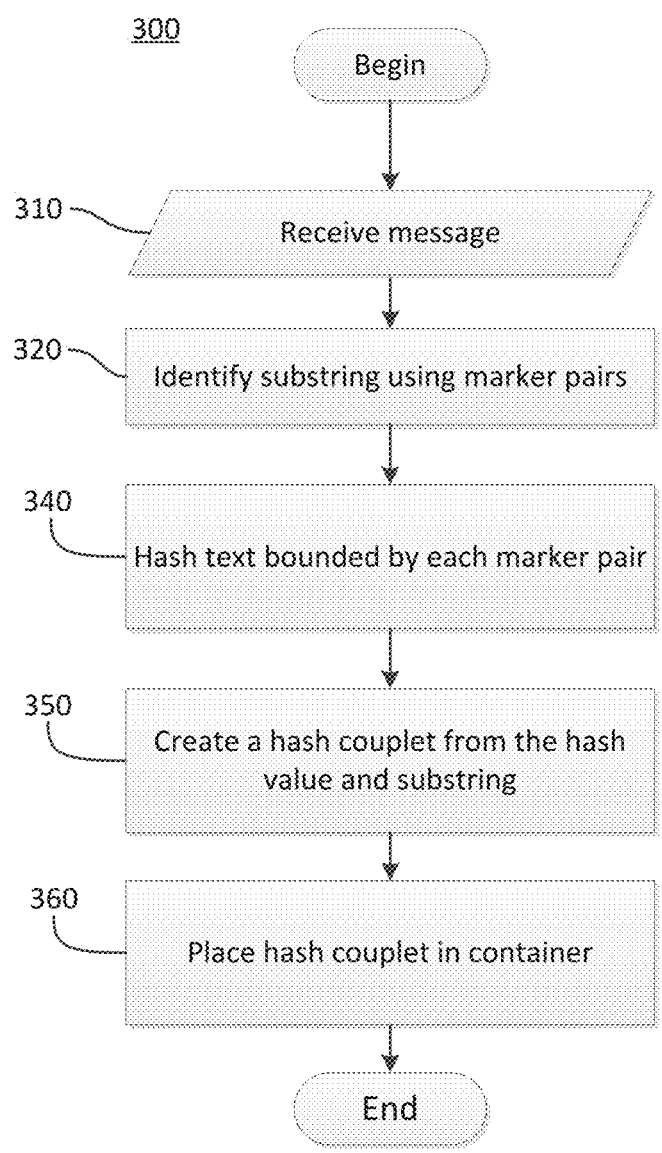
FIG. 3 illustrates a method for identifying message fragments for potential optimization, according to one embodiment.

FIG. 3 illustrates a method 300 for identifying message fragments for potential optimization, according to one embodiment. As shown, the method 300 begins at step 310, where the preprocessor 200 receives the text of a first message. At step 320, preprocessor 200 identifies substrings of the first message as candidates for optimization by identifying text elements as marker pairs bounding a substring. For example, a first message formatted in XML may contain a number of tags used to define XML elements that contain both text and attributes of the element. Each XML element includes a start tag and an end tag, such as, by way of example, "<address>" and "</address>", respectively, while the XML element's attributes and content are defined in the text between the start tag and end tag. Thus, the XML element as a whole is represented by a substring starting with the start tag text and continuing until the end tag is complete. In the example, preprocessor 200 identifies sub strings for optimization by creating a string that includes a start tag and all subsequent text in the message until and including the matching end tag.

At step 340, preprocessor 200 computes a hash value of the message substring. At step 350, preprocessor 200 creates a hash couplet element including the hash value with the message substring. The hash value of the hash couplet is used to determine if cache 210 contains a key value pair corresponding to the message substring, in which case preprocessor 200 creates an optimization element that parser 220 incorporates when processing the first the message. If cache 210 does not contain a key value pair corresponding to the hash value, then parser 220 will use the hash couplet to create a new key value pair that corresponds to the message substring. Parser 220 adds the new key value pair to cache 210, and in this manner adds new content to the cache 210 that preprocessor 200 can use when processing future messages.

In embodiments configured to evaluate a communication protocol that include message formats allowing nested marker pairs, several concurrent hash operations are generated. For example, an XML message containing three start/end tag pairs would generate three concurrent hash operations if all three start tags appeared in the message text before the first end tag. Large numbers of concurrent hash operations can degrade performance of the ESB if a cryptographically secure hash algorithm is used. Embodiments using high performance rolling hash functions, e.g., such as the Rabin fingerprint allow for efficient processing of concurrent hash operations. In step 360, the preprocessor 200 places the hash couplet in a container.

Figure 4:
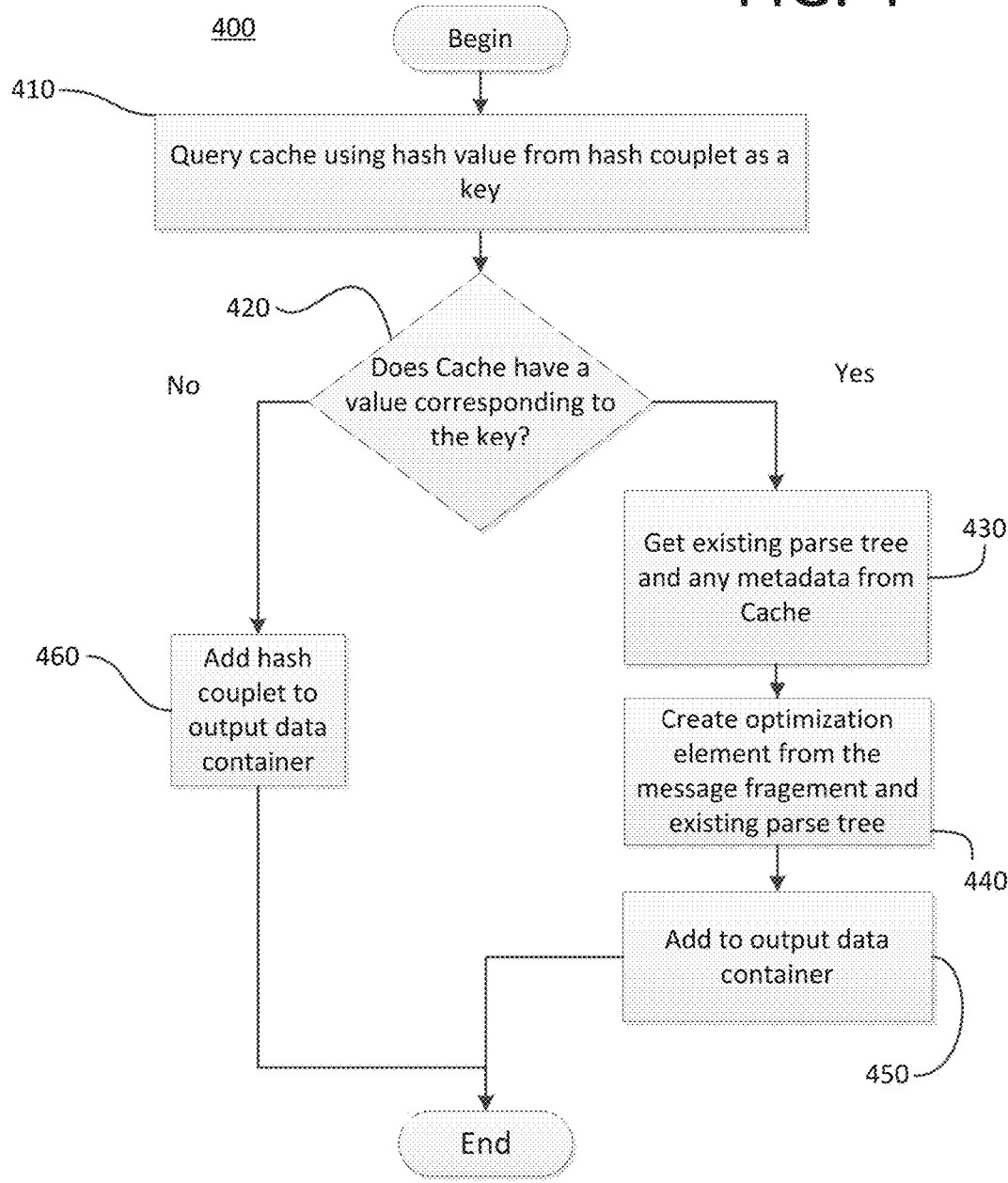
FIG. 4 illustrates a method for identifying existing message parse subtrees to optimize new message parsing, according to one embodiment.

FIG. 4 illustrates a method 400 for identifying a message parse subtree to use to optimize new message parsing, according to one embodiment. Preprocessor 200 evaluates each hash couplet in the container using method 400. As shown, the method 400 begins at step 410, where the preprocessor 200 queries cache 210 using the hash value from the hash couplet as the cache key. At step 420, the query is evaluated to determine if cache 210 contains a cache value corresponding to that hash value cache key. When cache 210 does contain a value for the cache key then the method proceeds to step 430, where preprocessor 200 gets the existing parse tree stored as the cache value from the cache 210. At step 440, preprocessor 200 creates an optimization element containing the message fragment from the hash couplet and the existing parse tree and at step 450 adds the optimization element to an output data container.

If cache 210 does not contain a cache value for the hash value cache key, then, at step 460, the hash couplet is added to the output data container. Once all hash couplets in the container have been evaluated, the message text and the output data container are sent to the parser 220.

Figure 5:
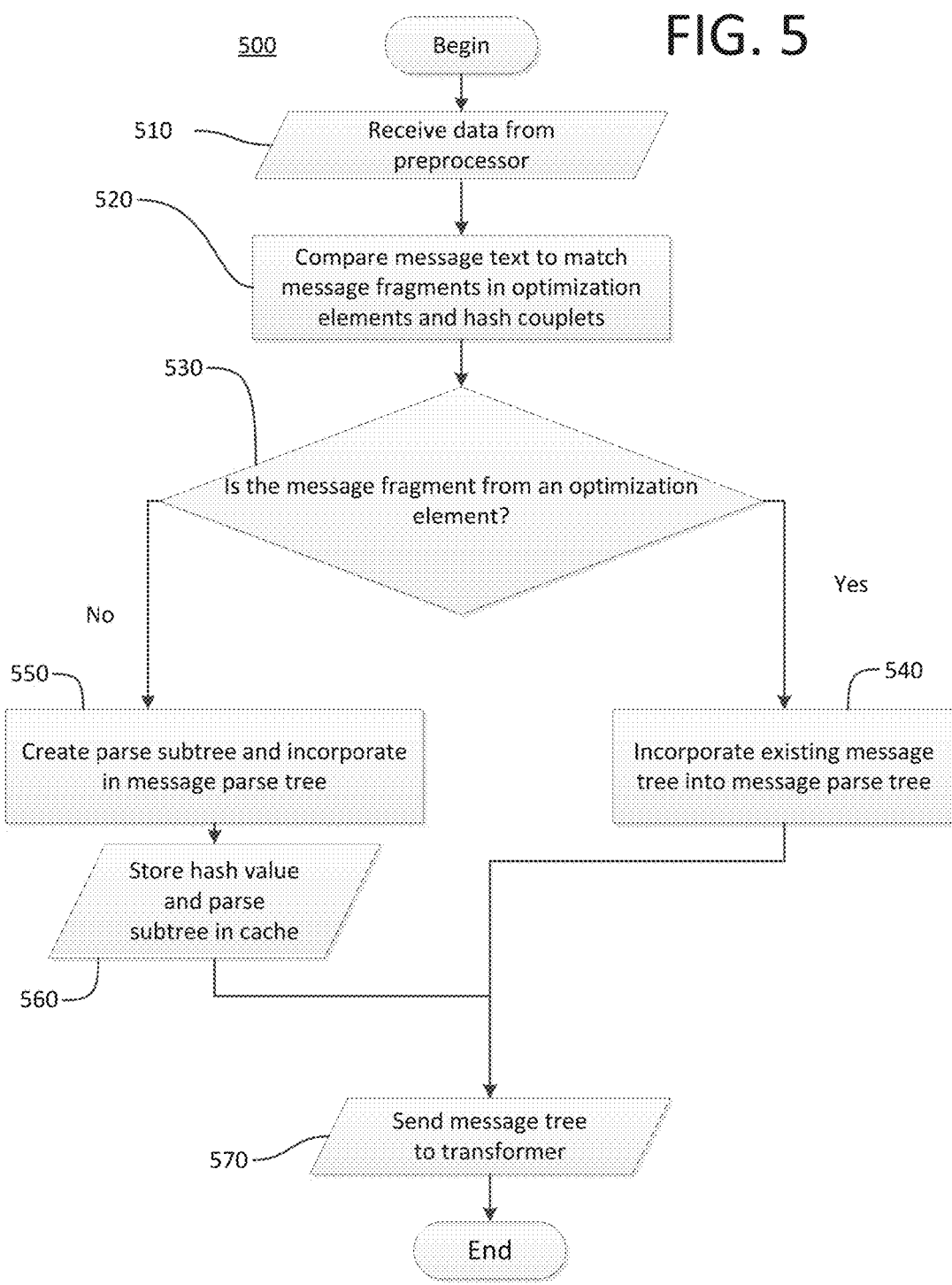
FIG. 5 illustrates a method of processing an incoming message using one or more pre-identified message parse subtrees to construct a message parse tree, according to one embodiment.

FIG. 5 illustrates a method 500 of parsing an incoming message to construct a message parse tree representing the data object 115, according to one embodiment. The method 500 begins at step 510, where parser 220 receives the output data container from preprocessor 200. Parser 220 begins lexical analysis of the first message text to generate a series of tokens used to create the message parse tree. At step 520, the parser may compare the message text to message fragments from each optimization element and each hash couplet in the output data container as it performs the lexical analysis. When the message text matches a message fragment from an optimization element, the message text has been previously processed and the parse tree and any prior results, such as validation, from the prior processing is present in the optimization element. Parser 220 can use the parse tree and prior results from the optimization element to represent the message text in the message parse tree, reducing the processing load on parser 220. When the message text matches a message fragment from a hash couplet, the message text has not been previously processed but was identified by the preprocessor 200 as a candidate for an optimization element in the future. Thus, the message fragment in the hash couplet identifies a portion of the message that parser 220 may generate a new key value pair to add to cache 210 to use in processing future messages.

At step 530, parser 220 evaluates message fragment to determine if it matches the text from an optimization element. If the message fragment does match an optimization element, then the method proceeds to step 540, where the parser 220 incorporates the parse tree and any prior processing results from the matching optimization element into the message parse tree. By incorporating the existing parse tree, parser 220 can create the message parse tree more efficiently by eliminating the analysis of tokens representing the message fragment portion of the message text. If the optimization element includes prior processing results, such as validation, parser 220 can increase its efficiency further by reusing these state independent processing results, such as validation. If the matching message fragment is not from an optimization element, i.e., it matches a hash couplet, then the method proceeds to step 550 where parser 220 generates a parse subtree by analyzing the tokens previously identified as being generated from the message fragment. Parser 220 incorporates the parse subtree into the message parse tree, and at step 560, stores the hash value from the hash couplet and the parse subtree in the cache 210 as a new key value pair. Parser 220 completes the message parse tree when is has processed all of the tokens and optimization elements, at which point parser 220 sends the message parse tree to the transformer 230 as shown in step 570.

Transformer 230 uses the message parse tree to create a second message with the same with the same information as the first message that conforms to the rules of the communications protocol used by the receiving system 120. The ESB 100 then serializes and transmits the second message to the receiving system 120. Receiving system 120 deserializes the second message and constructs data object 125 from the second message.

Figure 6:
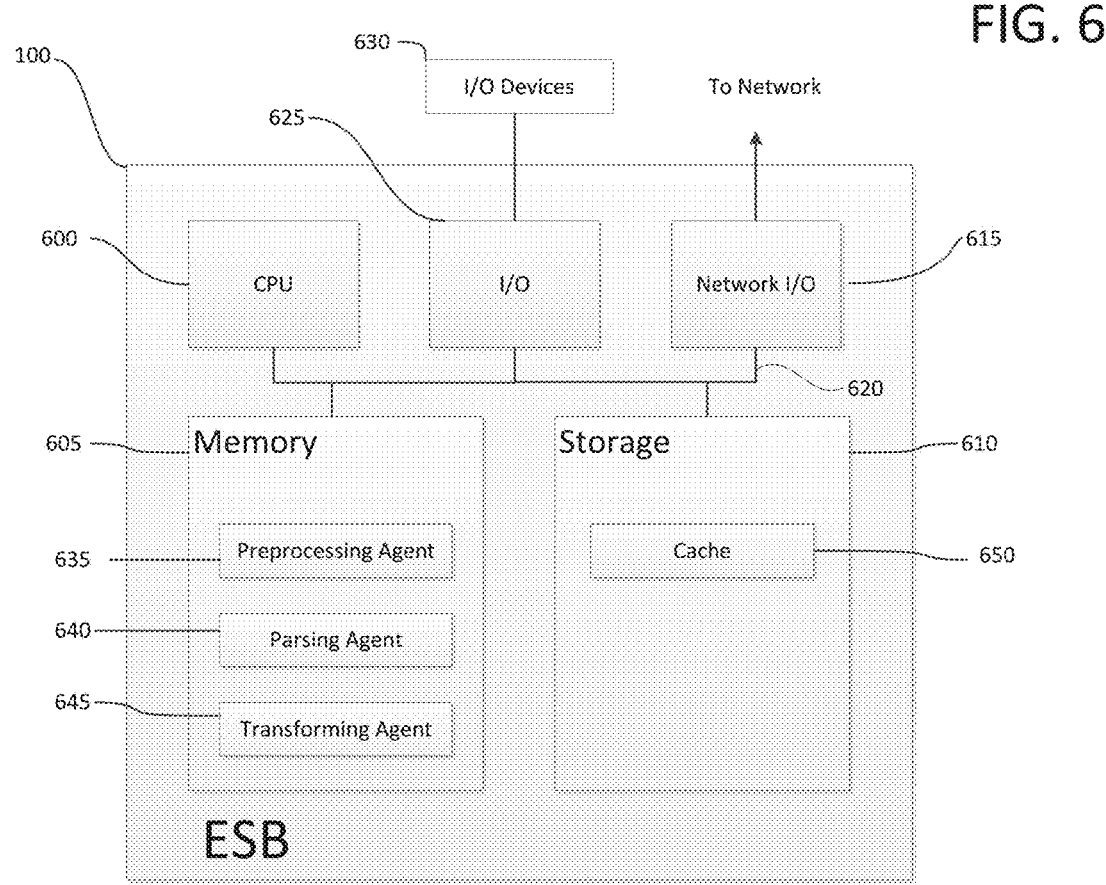
FIG. 6 illustrates an enterprise service bus computing system configured to provide optimized validation and parsing, according to one embodiment.

FIG. 6 illustrates an ESB 100 configured to provide optimized validation and parsing, according to one embodiment. As shown, ESB 100 includes, without limitation, a central processing unit ("CPU") 600, a memory 605, storage 610, and a network interface 615, each connected to a bus 620. The ESB 100 may also include an I/O device interface 625 connecting I/O devices 630 (e.g., keyboard, display, mouse devices, etc.) to the ESB 100.

CPU 600 retrieves and executes programming instructions stored in memory 605 as well as stores and retrieves application data residing in the storage 610. The bus 620 is used to transmit programming instructions and application data between CPU 600, I/O device interface 625, storage 610, network interface 615, and memory 605. Note, CPU 600 is included to be representative of a single CPU, multiple CPUs, a single CPU having multiple processing cores, and the like. Memory 605 is generally included to be representative of a random access memory. Storage 610 may be a disk drive storage device or a solid state drive storage device. Although shown as a single unit, storage 610 may be a combination of fixed and/or removable storage devices, such as fixed disc drives, removable memory cards, or optical storage, network attached storage ("NAS"), or a storage area network ("SAN").

Illustratively, memory 605 includes a preprocessing agent 635, a parsing agent 640, and a transforming agent 645. When a first message is received at the ESB 100 through the network I/O 615, the first message is deserialized by CPU 600 and network I/O 615 and the first message text is communicated to preprocessing agent 635. Processing agent 635 identifies message fragments for optimized processing by creating message fragments bounded by markers defined by the first message communication protocol. For each message fragment, the processing agent 635 computes a hash value of the message fragment, and queries cache 650 maintained in storage 610 using the hash value as a key. If cache 650 contains a value for the hash value key, including at least an existing parse tree, then preprocessing agent 635 retrieves the value and incorporates the existing parse tree into an optimization element. If the cache 650 does not contain a value for the hash value key, then preprocessing agent 635 creates a hash couplet including the hash value and the message fragment. The preprocessing agent 635 communicates the optimization elements and hash couplets to the parsing agent 640.

Parsing agent 640 begins lexical analysis of the first message text to generate a series of tokens used to create a message parse tree. Parsing agent 640 will compare the message text to message fragments from each optimization element and each hash couplet in the output data container as it performs the lexical analysis. In an alternative embodiment, parsing agent 640 compares the message text to message fragments from each optimization elements and each hash couplet prior to generating the tokens from the lexical analysis. Parsing agent 640 evaluates message fragments matching the message text by determining, as whether the message fragment is from an optimization element or from a hash couplet. If the fragment matches an optimization element, then parsing agent 640 incorporates the existing parse tree included in the optimization element into the message parse tree to represent the message fragment. By incorporating the existing parse tree, parsing agent 640 can create the message parse tree more efficiently by eliminating the analysis of tokens representing the message fragment portion of the message text. If the matching message fragment is from a hash couplet, then parsing agent 640 generates a parse subtree by analyzing the tokens previously identified as being generated from the message fragment, and incorporates the parse subtree into the message parse tree. Parsing agent 640 stores the hash value from the hash couplet and the parse subtree in the cache 650 as a cache key and cache value, respectively. Parsing agent 640 completes the message parse tree when is has processed all of the tokens and optimization elements, at which point parsing agent 640 sends the message tree to the transforming agent 645.

Transforming agent 645 receives the message parse tree, identifies the receiving system's 120 communication protocol, and creates a second message conforming to the receiving system's 120 communication protocol from the message parse tree representing the data object 115. The transforming agent serializes the second message and transmits it to the receiving system 120 using network I/O 615. Receiving system 120 deserializes the second message and constructs data object 125 from the second message.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for providing interoperability between systems in a distributed computing environment, the method comprising:
    receiving, at an enterprise service bus, a first message formatted according to a first communications protocol;
    generating a hash value for a message fragment of the first message;

accessing a key value cache using the generated hash value as a key to retrieve a first parse tree from the key value cache;

generating a message parse tree that represents the first message, wherein the first parse tree is incorporated in the message parse tree to represent the message fragment; and processing the message parse tree to generate a second message formatted according to a second communications protocol.

2. The method of claim 1, wherein the message fragment is identified by a start marker and an end marker.

3. The method of claim 2, wherein the start and end markers are defined by the message format.

4. The method of claim 1, further comprising:

identifying a second message fragment of the first message;

computing a second hash value of the second message fragment;

requesting, from the cache, a second parse tree using the second hash value as the key;

generating a parse subtree from the second message fragment when cache does not contain an second parse tree for the second hash value; and storing the parse subtree in the cache using the second hash value as the key.

5. The method of claim 1, wherein the hash value is computed using a rolling hash algorithm.

6. The method of claim 1, the method further comprising:

retrieving metadata including a processing result from the key value cache, wherein the hash value is used as the key; and evaluating the message fragment using the processing result.

7. The method of claim 6, wherein the processing result comprises a message schema validation result, and wherein evaluating the message fragment using the processing result comprises refraining from performing message validation for the message fragment.

8. A computer-readable storage medium storing instructions, which, when executed on a processor, performs an operation for providing interoperability between systems in a distributed computing environment, the operation comprising:

receiving, at an enterprise service bus, a first message formatted according to a first communications protocol;

generating a hash value for a message fragment of the first message;

accessing a key value cache using the generated hash value as a key to retrieve a first parse tree from the key value cache;

generating a message parse tree that represents the first message, wherein the first parse tree is incorporated in the message parse tree to represent the message fragment; and processing the message parse tree to generate a second message formatted according to a second communications protocol.

9. The computer-readable storage medium of claim 8, wherein the message fragment is identified by a start marker and an end marker.

10. The computer-readable storage medium of claim 8, wherein the start and end markers are defined by the message format.

11. The computer-readable storage medium of claim 8, wherein the operation further comprises:

identifying a second message fragment of the first message;

computing a second hash value of the second message fragment;

requesting, from the cache, a second parse tree using the second hash value as the key;

generating a parse subtree from the second message fragment when cache does not contain an second parse tree for the second hash value; and storing the parse subtree in the cache using the second hash value as the key.

12. The computer-readable storage medium of claim 8, wherein the hash value is computed using a rolling hash algorithm.

13. The computer-readable storage medium of claim 8, the operation further comprising:

retrieving metadata including a processing result from the key value cache, wherein the hash value is used as the key; and evaluating the message fragment using the processing result.

14. The computer-readable storage medium of claim 13, wherein the processing result comprises a message schema validation result, and wherein evaluating the message fragment using the processing result comprises refraining from performing message validation for the message fragment.

15. An enterprise service bus, comprising:

a processor; and memory hosting an message processing agent, which, when executed on the processor, performs an operation for providing interoperability between systems in a distributed computing environment, the operation comprising:

receiving, at an enterprise service bus, a first message formatted according to a first communications protocol;

generating a hash value for a message fragment of the first message;

accessing a key value cache using the hash value as a key to retrieve a first parse tree from the key value cache;

generating a message parse tree that represents the first message, wherein the first parse tree is incorporated in the message parse tree to represent the message fragment; and processing the message parse tree to generate a second message formatted according to a second communications protocol.

16. The enterprise service bus of claim 15, wherein the message fragment is identified by a start marker and an end marker.

17. The enterprise service bus of claim 16, wherein the start and end markers are defined by the message format.

18. The enterprise service bus of claim 15, wherein the operation further comprises:

identifying a second message fragment of the first message;

computing a second hash value of the second message fragment;

requesting, from the cache, a second parse tree using the second hash value as the key;

generating a parse subtree from the second message fragment when cache does not contain an second parse tree for the second hash value; and storing the parse subtree in the cache using the second hash value as the key.

19. The enterprise service bus of claim 15, wherein the hash value is computed using a rolling hash algorithm.

20. The enterprise service bus of claim 15, the operation further comprising:
  retrieving metadata including a processing result from the key value cache, wherein the processing result comprises a message schema validation result; and
  evaluating the message fragment using the processing result, wherein evaluating the message fragment using the processing result comprises refraining from performing message validation for the message fragment.

\* \* \* \* \*